United States Patent
Charlantini et al.

(10) Patent No.: US 9,641,259 B1
(45) Date of Patent: May 2, 2017

(54) SYSTEM AND METHOD FOR PULSED BASED RECEIVER PHOTO SENSOR

(71) Applicant: Rockwell Automation Technologies, Inc., Mayfield Heights, OH (US)

(72) Inventors: Donald L. Charlantini, Nashua, NH (US); Gregory J. Reimann, Acton, MA (US); Derek W. Gallon, Arlington, MA (US); Frederic Boutaud, Lexington, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/186,939

(22) Filed: Jun. 20, 2016

(51) Int. Cl.
*H04B 10/69* (2013.01)
*H04B 10/00* (2013.01)
*H04B 1/717* (2011.01)
*G02B 6/35* (2006.01)
(Continued)

(52) U.S. Cl.
CPC ......... *H04B 10/691* (2013.01); *H04B 10/152* (2013.01); *G02B 6/3598* (2013.01); *H01S 3/00* (2013.01); *H04B 1/7174* (2013.01); *H04B 7/17* (2013.01)

(58) Field of Classification Search
CPC .. H04B 10/691; H04B 10/152; H04B 1/7174; H04B 7/17; G02B 6/3598; H01S 3/00; H04L 25/03834
See application file for complete search history.

(56) References Cited

U.S. PATENT DOCUMENTS

| 4,473,296 A | 9/1984 | Shofner et al. |
| 6,160,259 A | 12/2000 | Petrillo et al. |

(Continued)

FOREIGN PATENT DOCUMENTS

| EP | 2442135 | 4/2012 |
| EP | 2581759 | 4/2013 |

OTHER PUBLICATIONS

Photoswitch® Photoelectric Sensors, Rockwell Automation, Inc., 2014, retrieved on Jun. 18, 2015, 18 pages.
(Continued)

*Primary Examiner* — Francis M Legasse, Jr.
(74) *Attorney, Agent, or Firm* — Amin, Turocy & Watson, LLP

(57) ABSTRACT

A photoelectric sensor uses a selective pulse detection technique and associated synchronization techniques to improve the quality of pulse detection, the operating range of the sensor, and the sensor's immunity to noise. These improvements also yield faster sensor response times and reduce the design cycle time. A modulated light beam emitted by the sensor's emitter comprises multiple pulse periods, with a pulse being transmitted within each period. The pulses are positioned within their respective periods at a defined offset time relative to the start of the periods, where the offset time can vary between periods according to a defined pattern. The receiver can selectively sample the signal based on synchronization information to determine whether the received signal contains the emitted pulse pattern. Through-beam sensor embodiments can generate the synchronization information internally based on an analysis of the analog signal corresponding to the modulated signal.

20 Claims, 17 Drawing Sheets

(51) Int. Cl.
 *H04B 7/17* (2006.01)
 *H01S 3/00* (2006.01)

(56) References Cited

U.S. PATENT DOCUMENTS

| | | | | |
|---|---|---|---|---|
| 6,208,445 | B1* | 3/2001 | Reime .................. | H04B 10/114 398/106 |
| 6,775,482 | B1* | 8/2004 | Shimomura ......... | H04B 10/299 398/182 |
| 2015/0153223 | A1 | 6/2015 | Onishi et al. | |

OTHER PUBLICATIONS

Extended European Search Report for EP Patent Application Serial No. 16159394.2, dated Jul. 20, 2016, 7 pages.
European Office Action for EP Patent Application Serial No. 16159394.2, dated Sep. 19, 2016, 2 pages.
Office Action for U.S. Appl. No. 14/642,687, dated Jan. 30, 2017, 51 pages.

* cited by examiner

SYSTEM AND METHOD FOR PULSED BASED RECEIVER PHOTO SENSOR

BACKGROUND

The subject matter disclosed herein relates generally to photoelectric sensors, and, more particularly, to detection of modulated pulse signals at the sensor's receiver.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a photoelectric sensor is provided comprising a photo-sensor component configured to receive optical information and convert the optical information to an analog signal, the optical information including a light beam having a modulated signal comprising pulses; a digital sampling component configured to digitally sample the analog signal at a sample timing defined by synchronization information to yield digital sample information; a pulse identification component configured to identify presence and timings of the pulses in the analog signal based on the digital sample information; a timing analysis component configured to determine whether the timings of the pulses correspond to an expected timing defined by the synchronization information; and an output control component configured to control an output based on a result generated by the timing analysis component.

A method for operating a photoelectric sensor is also described, wherein the method comprises receiving, by a photoelectric sensor comprising at least one processor, optical information including a light beam modulated with a signal comprising pulses; converting, by the photoelectric sensor, the optical information to an analog signal; digitally sampling, by the photoelectric sensor, the analog signal according to a sample timing determined based on synchronization information to yield digital sample information; determining, by the photoelectric sensor, amplitude and timing information based on the digital sample information; determining, by the photoelectric sensor, whether the amplitude and timing information corresponds to an expected amplitude and timing specified by the synchronization information; and controlling, by the photoelectric sensor, an output signal based on a result of the determining.

Also, in one or more embodiments, a non-transitory computer-readable medium is provided having stored thereon executable components that, in response to execution, cause a processor to perform operations, the operations comprising receiving optical information including a light beam modulated with a signal comprising pulses; converting the optical information to an analog signal; digitally sampling the analog signal according to a sample timing determined based on synchronization information to yield digital sample information; determining amplitude and timing information based on the digital sample information; determining whether the amplitude and timing information corresponds to an expected amplitude and timing indicated by the synchronization information; and controlling an output signal based on a result of the determining.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
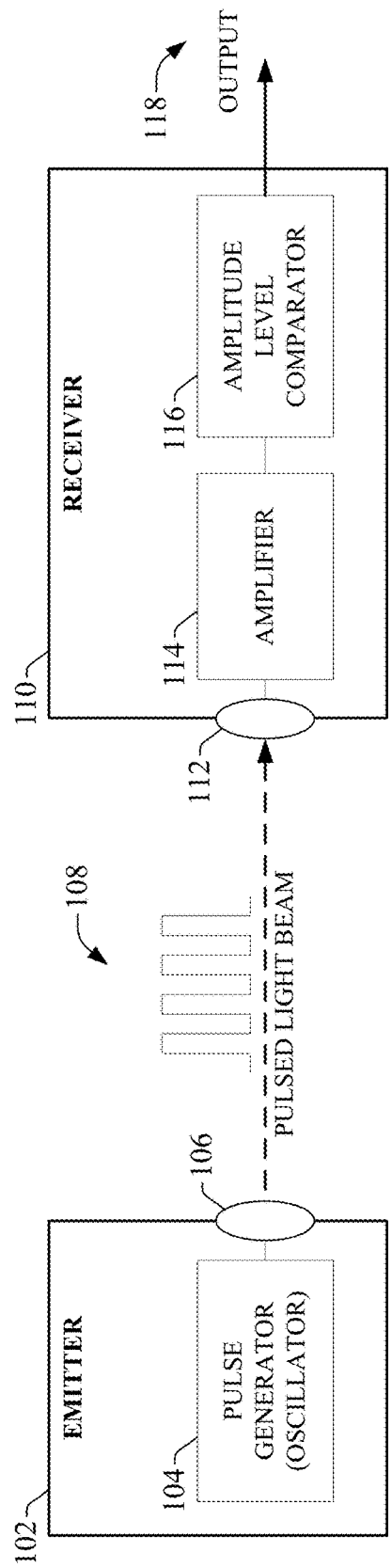
FIG. 1 is a block diagram of an example through-beam photoelectric sensor that uses light pulse modulation.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Many industrial applications utilize photoelectric sensors to detect presence of objects or people at certain locations around a controlled process or machine. For example, such sensors may be mounted at selected conveyor locations to detect the presence of a part at those locations. Such photoelectric sensors may also be mounted near potentially hazardous moving components of the industrial system to detect human presence at these locations. These sensors typically control a discrete output to a control system (e.g., an industrial controller, a safety relay, etc.) based on detection of an emitted light beam at a receiver.

Typically, on-off type photoelectric sensors project light beams using light pulse modulation. Different types of photoelectric sensors are available, corresponding to different operating types. For example, FIG. 1 illustrates an example through-beam photoelectric sensor that uses light pulse modulation. Through-beam photoelectric sensors comprise a transmitter or emitter 102 that projects a light beam to a separate receiver 110 aligned to emitter's line-of-sight. Through-beam photoelectric sensors are generally on-off type sensors that generate a discrete output based on the presence or absence of an object between the emitter 102 and receiver 110. Emitter 102 comprises a pulse generator 104 (also referred to as an oscillator) that modulates a light beam into a stream of high-frequency light pulses 108 directed to the receiver 110. The light pulses 108 are projected via a light emitting diode (LED) 106, laser, or other current-driven light source on the emitter 102. Presence of the modulated pulses are detected by the receiver 110, allowing the receiver to distinguish the beam from ambient (non-pulsed) light. The receiver 110 receives the pulsed light beam via optical components 112 (e.g., lenses, windows, etc.). The light beam is converted to an electrical signal that is passed through an amplifier 114, and an amplitude level comparator 116 determines whether the magnitude of the amplified signal exceeds a threshold indicating that the light beam was received at optical components 112. The sensor generates an output 118 based on detection of a minimum number of valid pulses. For a normally-on type sensor, the output remains on while the receiver 110 detects the light beam being sent by the emitter 102, and is turned off when the emitter fails to detect the beam, indicating that an obstruction has blocked the beam. For a normally-off type sensor, the output turns on when the beam is obstructed, and remains off while the emitter detects the beam.

Figure 2:
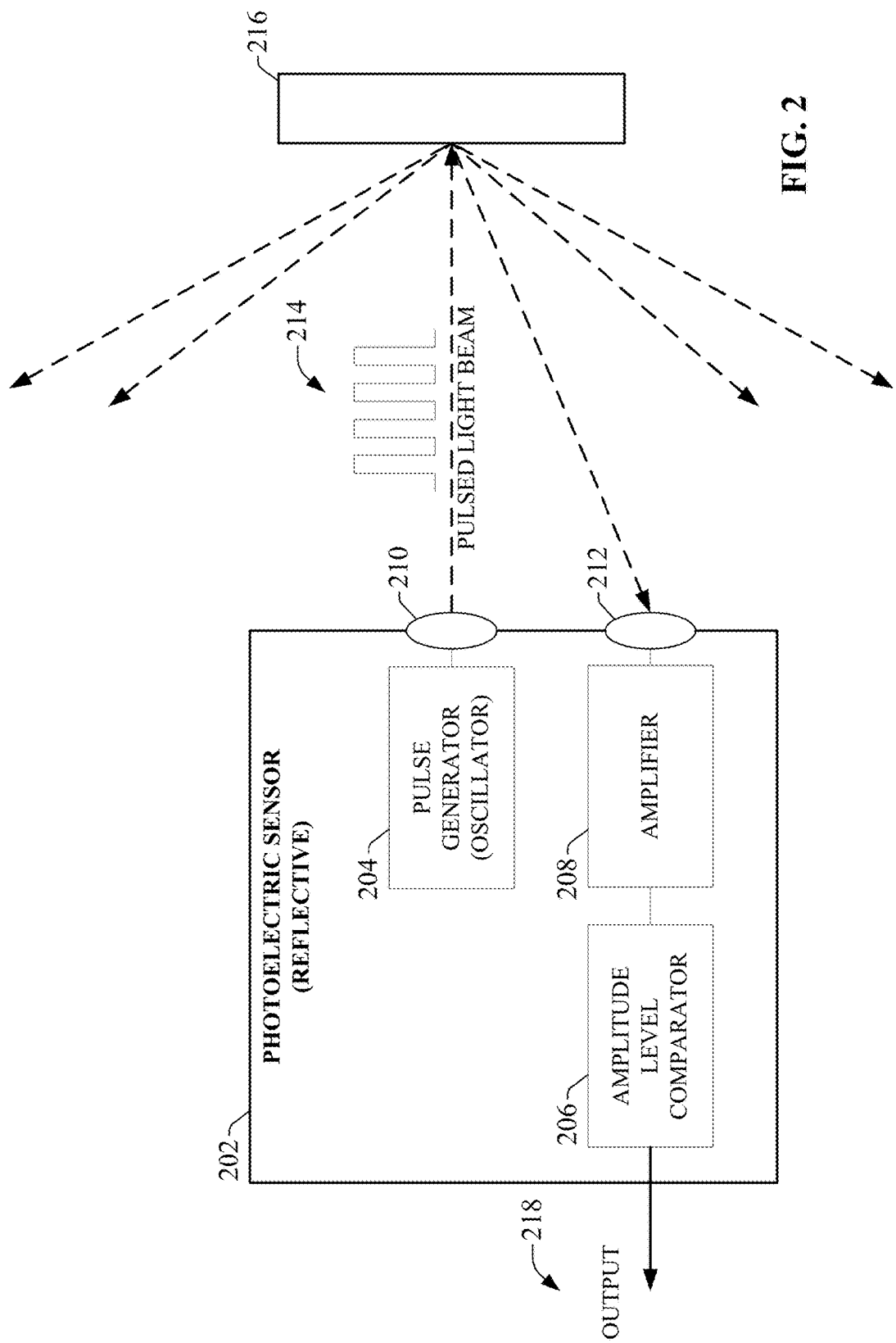
FIG. 2 is a block diagram of an example diffuse photoelectric sensor that uses light pulse modulation.

FIG. 2 illustrates an example diffuse photoelectric sensor. Diffuse sensors operate on a similar principle to that of through-beam sensors; however, rather than comprising physically separate emitter and receiver elements, a diffuse photoelectric sensors comprises a single element that houses both the emitter and receiver components. Similar to the through-beam sensor described above, photoelectric sensor 202 comprises a pulse generator 204 that projects a pulsed light beam 214 via LED 210. When an object 216 is placed in the sensor's line-of-site within the operating range of the light beam 214, the beam is reflected by the object 216 and a portion of the reflected light is received at window 212. The reflected beam is converted to an electrical signal and amplified by amplifier 208, and amplitude level comparator 206 confirms detection of the reflected beam based on a comparison of the magnitude of the amplified signal with a threshold value. Output 218 is generated based on a result of the comparison. In this way, objects placed in front of the sensor reflect modulated light back to the receiver, causing the sensor to indicate presence at the object.

A third type of photoelectric sensor—retro reflective sensors—emit a polarized light beam that reflects off of a reflector aligned with the sensing axis of the sensor's emitter. As long as properly polarized reflected light is detected by the sensor's receiver, the sensor assumes that no objects are positioned between the sensor and the reflector.

For photoelectric sensors that use light pulse modulation, the receiver typically detects the modulated pulses carried by the light beam based solely on the signal level and the number of pulses detected. However, without proper synchronization, this technique renders the sensor's receiver sensitive to any repetitive noise having an energy level similar to that of the modulated pulses. For example, electrical fast transient (EFT) noise or other light noise from nearby light sources can be mistaken by the sensor as a valid set of pulses, causing the sensor to generate a false trigger. Overcoming this sensitivity requires careful design of the sensor's electromagnetic shielding and printed circuit board (PCB) layout, which necessitates multiple iterations of the design implementation and can limit the level of performance that can be achieved by the sensor. Moreover, synchronization between the receiver and the emitter in the case of through-beam sensors is difficult, since the receiver and emitter of such through-beam sensors reside in physically separate housings, and therefore cannot easily exchange synchronization data.

To address this and other issues, particularly in the case of through-beam sensors, one or more embodiments described herein provide a sensor design that uses a more selective pulse detection technique and associated synchronization techniques to improve the quality of pulse detection, the operating range of the sensor, and the sensor's immunity to noise. These improvements can also yield faster sensor response times as well. While these techniques are not intended to serve as a substitute for effective EMI shielding and PCB layout design, the techniques described herein can reduce the design cycle time and improve performance of the resulting photoelectric sensor.

Figure 3:
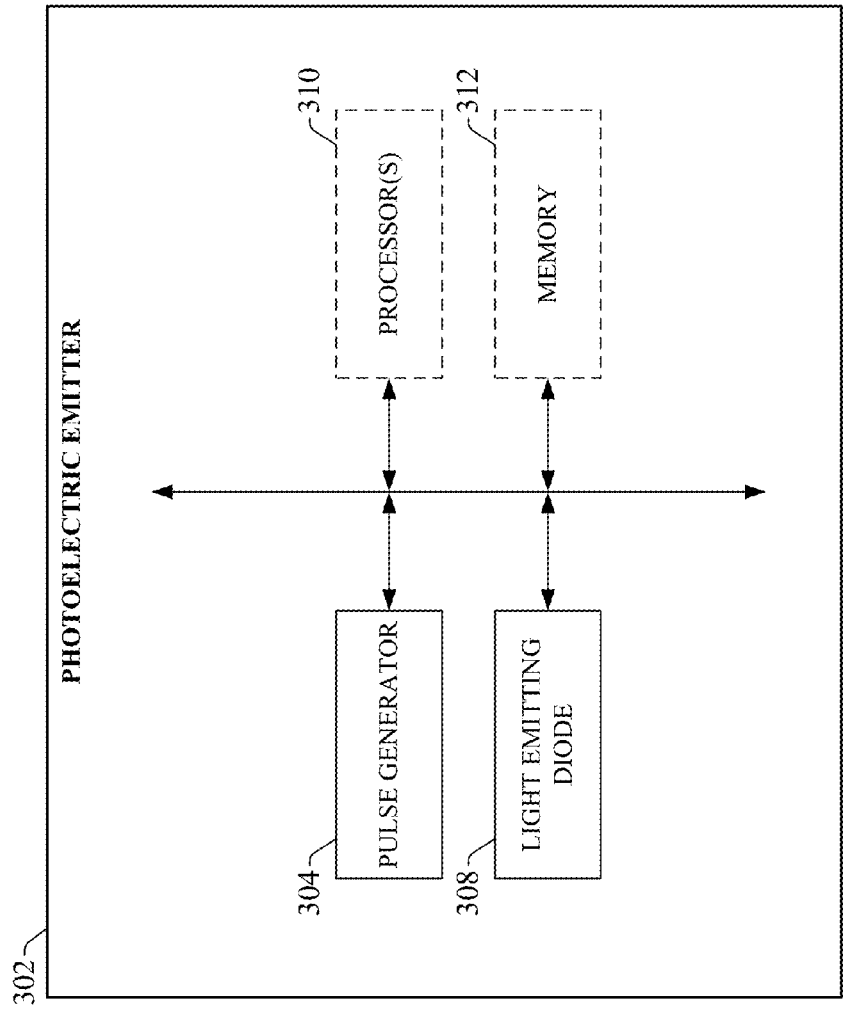
FIG. 3 is a block diagram of an example emitter of a photoelectric sensor.

FIG. 3 is a block diagram of an example emitter 302 of a photoelectric sensor according to one or more embodiments of this disclosure. Emitter 302 can be implemented in any suitable type of photoelectric sensor, including but not limited to diffuse, retro-reflective, or through-beam type sensors. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Emitter 302 can include a pulse generator 304, a light emitting diode (LED) 308. Optionally, emitter 302 can also include one or more processors 310 and memory 312. In various embodiments, one or more of the pulse generator 304, power control component 306, LED 308, the one or more processors 310, and memory 312 can be electrically and/or communicatively coupled to one another to perform one or more of the functions of the emitter 302. In some embodiments, one or more of components 304 or 308 can comprise software instructions stored on memory 312 and executed by processor(s) 310. Emitter 302 may also interact with other hardware and/or software components not depicted in FIG. 3. For example, processor(s) 310 may interact with one or more external user interface devices, such as a keyboard, a mouse, a display monitor, a touchscreen, or other such interface devices. Moreover, the photoelectric sensor may include LED indicators or other types of indicators to convey state information to a user. The photoelectric sensor may also include a communication link (wired or wireless) for communicating such information as an object presence indication, health and/or status information for the sensor, or other such information.

Pulse generator 304 can be configured to generate pulse data representing a series of on-off pulses for modulation of an emitted light beam. In some embodiments, pulse generator 304 can generate the pulses with a fixed timing between the pulses. Alternatively, some embodiments of pulse generator 304 can be configured to generate pulse patterns having variable times between pulses. Such variable pulse patterns may be defined in terms of a pattern cycle comprising a finite number of pulses N, with a variable timing between consecutive pulses within the pattern cycle. Such a pattern cycle will repeat every N pulses, using the same set of timings between the pulses of each pattern cycle. Light-emitting diode (LED) 308 can be configured to modulate a light beam in accordance with the pulse data generated by the pulse generator, and to emit the light beam. In some embodiments, the LED can also be configured to modulate the intensity of the light beam as well.

The one or more processors 310 can perform one or more of the functions described herein with reference to the systems and/or methods disclosed. In some embodiments, processor(s) 310 can be a part of a communication means (e.g., an IO-link or other type of communication means) to facilitate such functions as sensor configuration, diagnostic data retrieval, status monitoring, etc. Memory 312 can be a computer-readable storage medium storing computer-executable instructions and/or information for performing the functions described herein with reference to the systems and/or methods disclosed.

Figure 4:
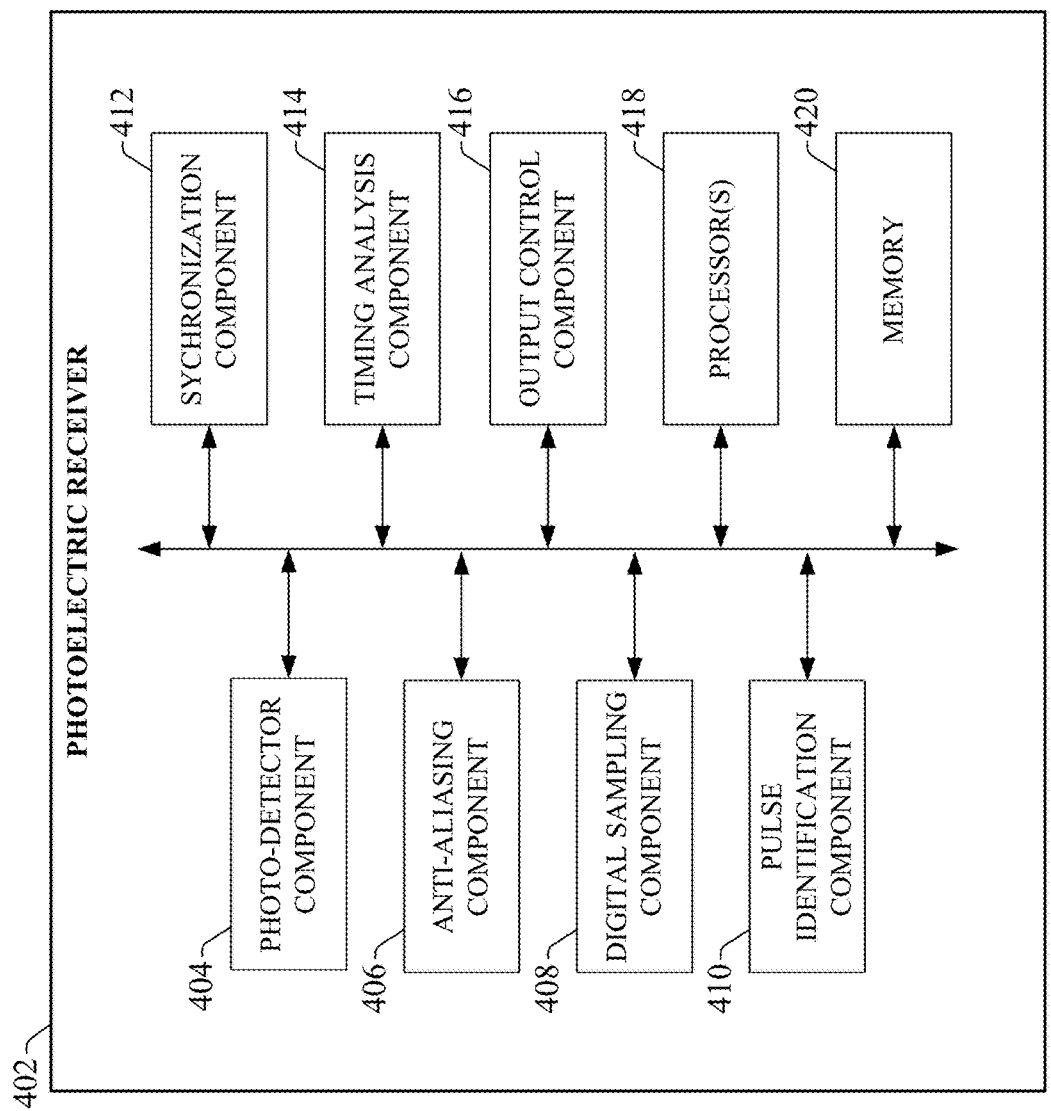
FIG. 4 is a block diagram of an example receiver of a photoelectric sensor.

FIG. 4 is a block diagram of an example receiver 402 of a photoelectric sensor according to one or more embodiments of this disclosure. As with emitter 302, receiver 402 can be implemented in any type of photoelectric sensor—e.g., diffuse, retro-reflective, through-beam, etc.—however, in the case of through-beam sensors the emitter will reside in a separate physical housing or package relative to the emitter 302, and will require external alignment with the emitter 302. Some components of receiver 402, such as the synchronization component 412, may be designed and configured to operate differently depending on whether the sensor is diffuse, retro-reflective, or through-beam. For example, synchronization techniques to be described herein will be particular to through-beam sensor embodiments.

Receiver 402 can include a photo-detector component 404, an anti-aliasing component 406, a digital sampling component 408, a pulse identification component 410, a synchronization component 412, a timing analysis component 414, an output control component 416, one or more processors 418, and memory 420. For sensors in which emitter 302 and receiver 402 reside in the same housing (e.g., retro-reflective or diffuse sensors), the one or more processors 418 and memory 420 may be the same as processors 310 and memory 312. In various embodiments, one or more of the photo-sensor component 404, anti-aliasing component 406, digital sampling component 408, pulse identification component 410, synchronization component 412, timing analysis component 414, output control component 416, the one or more processors 418, and memory 420 can be electrically and/or communicatively coupled to one another to perform one or more of the functions of the receiver 402. In some embodiments, one or more of components 404, 408, 410, 412, 414, and 416 can comprise software instructions stored on memory 420 and executed by processor(s) 418. Receiver 402 may also interact with other hardware and/or software components not depicted in FIG. 4. For example, processor(s) 418 may interact with one or more external user interface devices, such as a keyboard, a mouse, a display monitor, a touchscreen, or other such interface devices. Processor 418 can also be used to facilitate digital communication to the system for such purposes as diagnostic data retrieval, sensor configuration, etc.

Photo-detector component 404 can be configured to convert received light incident on a surface of the photo-sensor component to an electrical output analogous to the intensity of the incident light (e.g., in proportion to the intensity). Anti-aliasing component 406 can be configured to perform anti-aliasing on the electrical output generated by the photo-detector component 404; e.g., by filtering out high frequency noise to smooth the resulting signal. The digital sampling component 408 can be configured to perform digital sampling on the filtered signal output by the anti-aliasing component 406.

The pulse identification component 410 can be configured to identify valid pulses present in the filtered signal generated by the anti-aliasing component 406 in order to synchronize the sampling performed by the digital sampling component 408 with the pulse pattern sent by the emitter 302. The synchronization component 412 can be configured to analyze the pattern of pulses detected by the pulse identification component 410 and to generated synchronization information based on this pattern for use by the digital sampling component 408

Timing analysis component 414 can be configured to analyze the digital samples obtained by digital sampling component 408 and to determine whether the digital samples indicate that a valid pulse timing or pattern is present in the pulse-modulated light beam received by the photo-detector component 404. Output control component 416 can be configured to control an output signal generated by the sensor 402 based on presence or absence of the valid pulse pattern as determined by the timing analysis component 414. The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
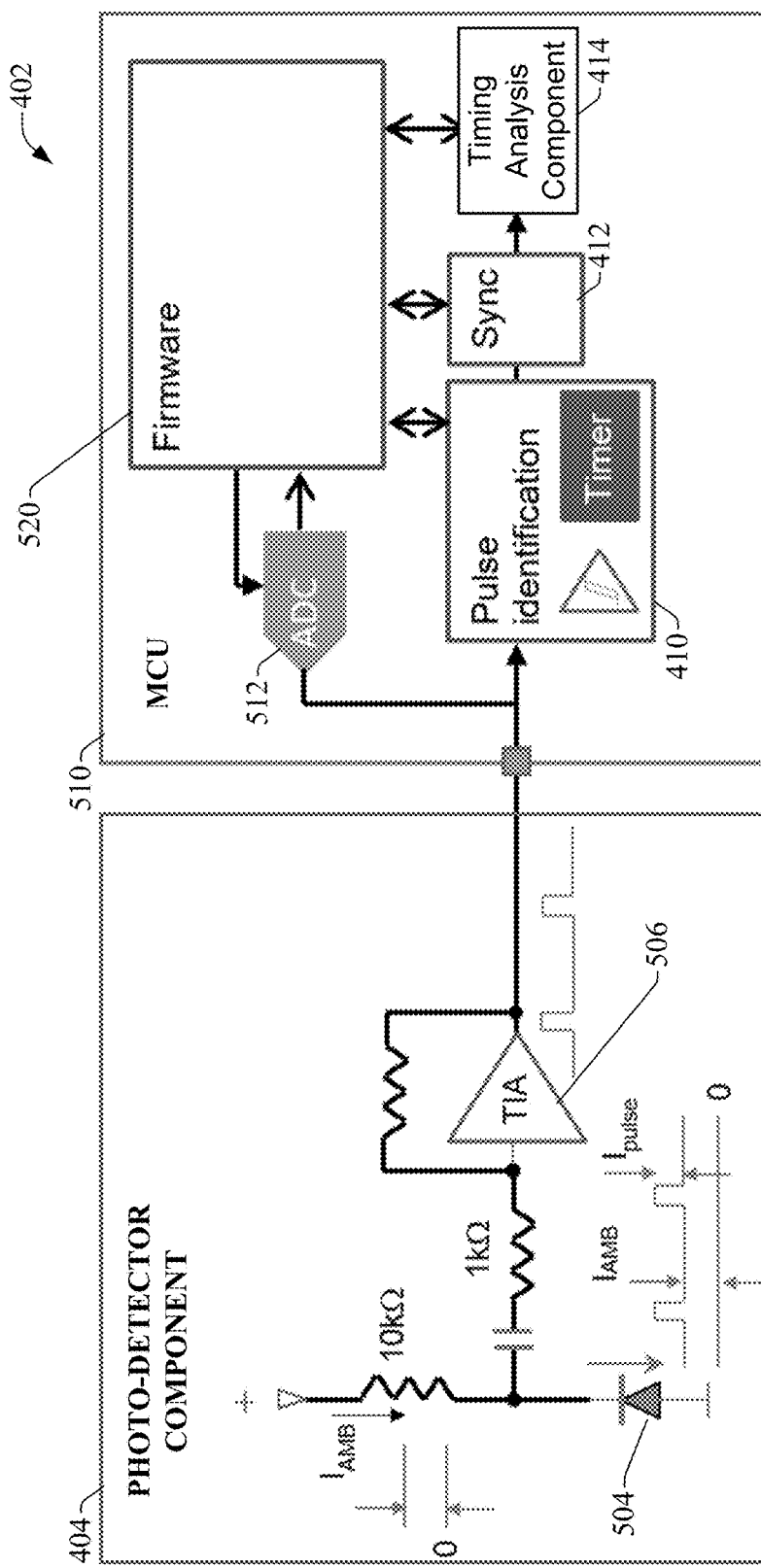
FIG. 5 is a block diagram of an example through-beam photoelectric receiver.

FIG. 5 is a block diagram of an example through-beam photoelectric receiver 402 illustrating components of the receiver in more detail. Receiver 402 may be part of a diffuse or through-beam type photoelectric sensor, although some synchronization features described herein will be specific to through-beam sensor embodiments. Photo-detector component 404 of the receiver 402 can include a photodiode 504 (e.g., an element of photo-detector component 404) that receives light via the receiver's photo-sensor and converts the light to an electric current proportional to the intensity of the incident light. When a pulse-modulated light beam from the sensor's emitter 302 (or a portion of the light beam) is received at the photo-sensor, either directly from the emitter in the case of through-beam sensors or as a reflected portion of the emitted beam in the case of diffuse sensors, the current waveform generated by the photodiode 504 will comprise a component corresponding to ambient light ($I_{AMB}$, corresponding to light from the sun, from incandescent sources, or other such ambient light) and an added component corresponding to the received pulse of the light beam ($I_{pulse}$). Photodiode 504 is alternating current (AC) coupled to a trans-impedance amplifier (TIA) 506. In some embodiments, the output of the TIA 506 can be filtered for anti-aliasing (e.g., using anti-aliasing component 406, not shown in FIG. 5), then converted into digital samples by an analog-to-digital converter (ADC) 512 that is integrated as part of the sensor's microcontroller (MCU) 510 (where the ADC 512 and associated control firmware are elements of digital sampling component 408).

Pulse identification component 410 and synchronization component 412 synchronize the timing of the digital samples obtained by the ADC 512 in accordance with a pulse pattern generated and transmitted by the emitter 302. In general, the ADC 512 samples the analog signal (the output of TIA 506) in synchronization with the emitter. Synchronizing the receiver 402 with the emitter 302 makes the receiver 402 capable of detecting and sampling the received pulses and enables the recognition of expected pulse pattern generated by the emitter 302. In accordance with one or more embodiments, described herein, synchronization also allows the ADC 512 to select appropriate times at which to sample the analog signal in order to determine whether the expected pulse pattern has been received. While synchronization of the emitter and receiver in the case of diffuse sensors (or certain other types of sensors, such as Pretro) is relatively simple, since the emitter and receiver reside in the same sensor housing and thus can easily exchange synchronization information, synchronization of the emitter and receiver in through-beam sensors can be more challenging due to the fact that the emitter and receiver are housed in separate units. Accordingly, the pulse identification component 410 and synchronization component 412 are configured to learn, detect, and recognize the emitted transmission pattern—in terms of the period, pulse positions, and/or amplitude—based on the analog output of the TIA. This synchronization technique will be described in more detail below.

The MCU 510 processes the samples, performs digital signal processing tasks for noise immunity and detection, and timing analysis component 414 determines whether to switch the sensor's output based on a determination of whether the detected pulse pattern matches the expected pulse pattern in terms of timing and/or relative amplitudes between pulses.

Components illustrated in FIG. 5 can be implemented in firmware, in hardware, or a combination of both firmware and hardware.

Figure 6:
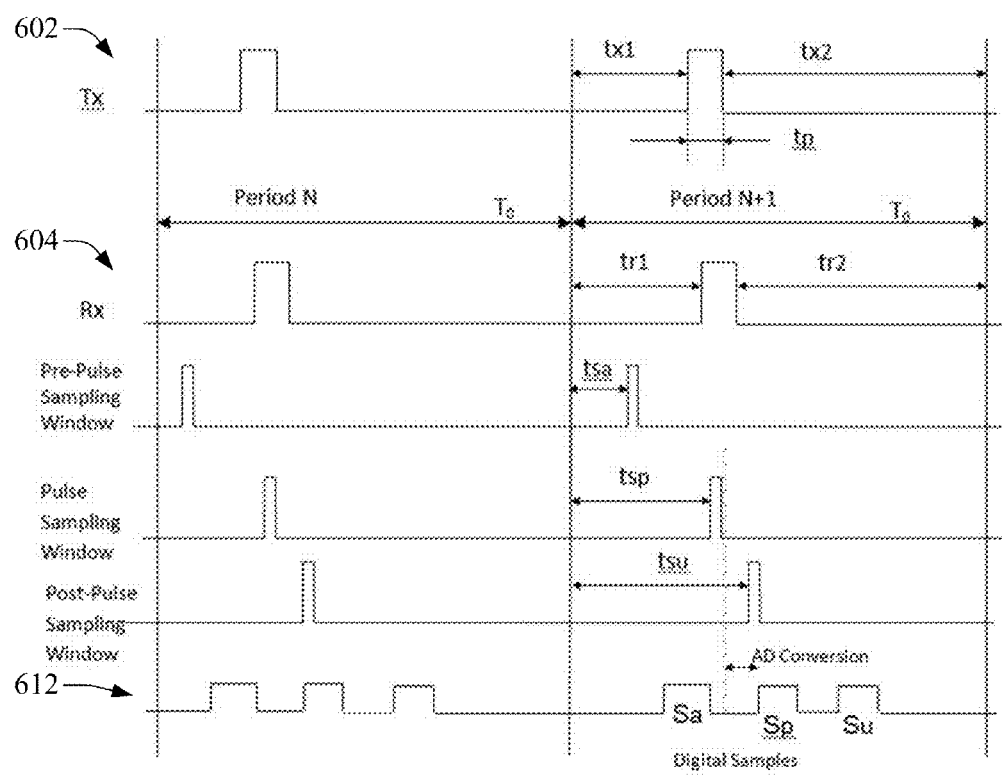
FIG. 6 are graphs illustrating the pulse timings generated by an emitter and detected by a receiver of a photoelectric sensor.

FIG. 6 illustrates the pulse timings generated by the emitter 302 (e.g., by the emitter's signal generator 304), which are detected by receiver 402. Transmit graph 602 represents the timing of pulses generated by the emitter 302, and receive graph 604 represents the timing of the pulses received at the receiver 402. The average period of the pulse sequence generated by the emitter 302 is $T_0$. Within each period of the pulse sequence, a pulse of duration tp is positioned within the period at a time tx1 after the start of the period (with tr1 being the corresponding measured position of the pulse as measured on the receiver side by the timing analysis component 414). In some embodiments, duration tx1 can be fixed for all periods, causing the pulse to be placed at the same location within each period; i.e., resulting in a fixed time between pulses. Alternatively, tx1 can vary from period to period according to a predefined sequence generated by the emitter's pulse generator 304. Such a varying sequence can assist in differentiating between sensors when multiple sensors are in use within close proximity to one another, since the receiver 402 will be synchronized with its corresponding emitter 302 such that the receiver only recognizes the pulse sequence generated by its corresponding emitter.

Figure 7:
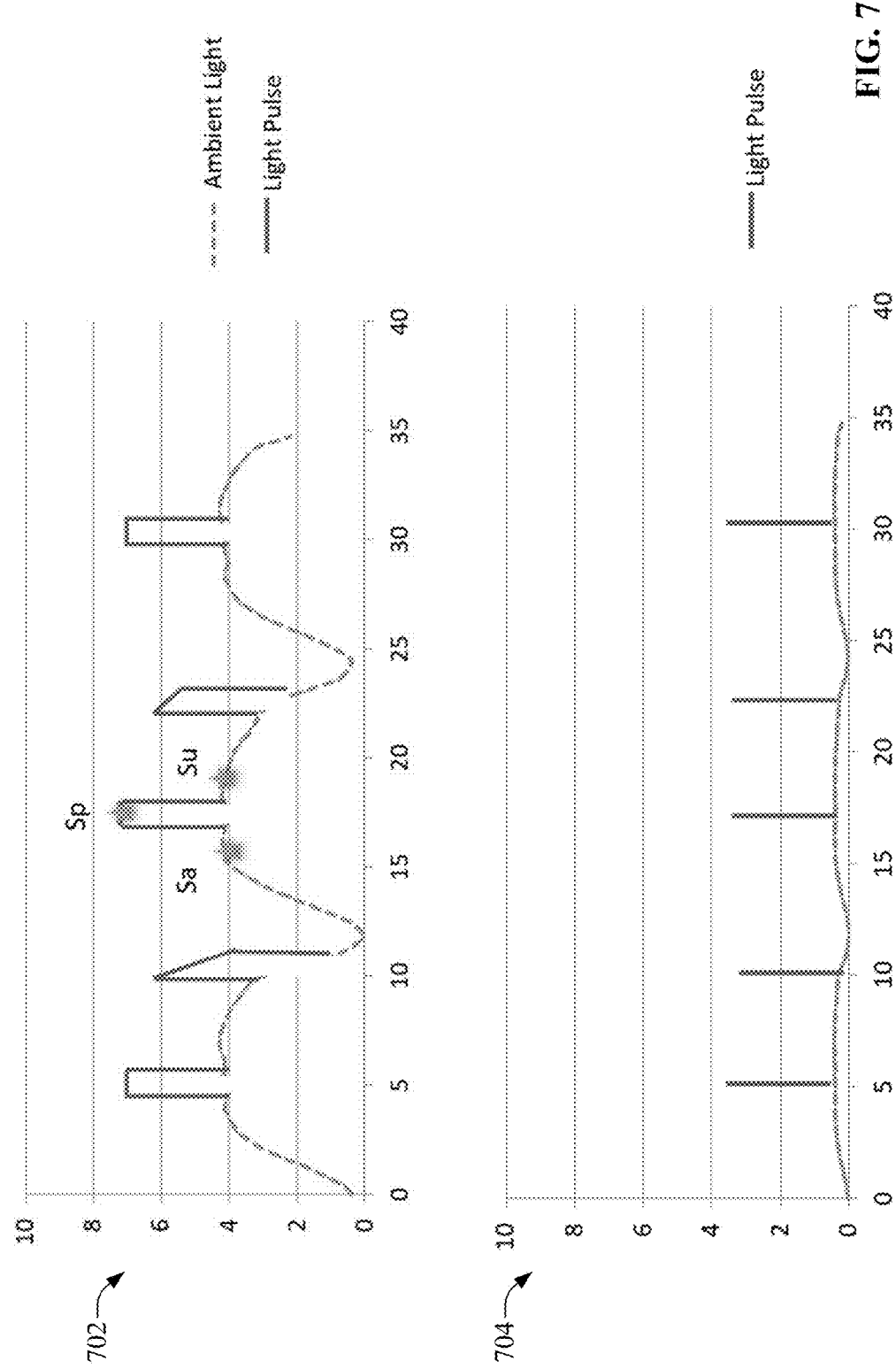
FIG. 7 are graphs illustrating separation of ambient light noise from modulated pulses using the sampling techniques described herein.

The received pulse signal (plotted in graph 604) is sampled synchronously and converted to digital values by the receiver's ADC 512. In an example sampling and conversion technique, the ADC 512 may obtain three samples within a given period—a first sample (Sa) before the pulse, a second sample (Sp) during the pulse, and a third sample (Su) after the pulse, as show in sample graph 612. This sampling sequence can separate lower frequency noise, such as modulated ambient light, from the pulse itself. FIG. 7 are graphs illustrating the separation of ambient light noise from modulated pulses using the sampling technique described above. Graph 702 depicts the signal waveform output by the TIA 506. The dashed lines of the graph 702 represent ambient light and/or other light noise received at the receiver's photo-sensor, and the solid lines represent the received pulses from the emitter, which are added to the lower frequency ambient light waveform. The three sampling locations corresponding to samples Sa, Sp, and Su are labeled on graph 702. In the case of diffuse photoelectric sensors, since the timing of the pulsed signal sent by the emitter is known to the receiver, the timing of the corresponding received signal is also known (delay due to time-of-flight is considered minimal in the diffuse case), allowing the receiver to select appropriate sampling times for Sa, Sp, and Su. Synchronization and recovery sample timing in the case of through-beam photoelectric sensors is discussed in more detail below.

Once the waveform magnitude values corresponding to each of these samples is obtained, the timing analysis component 414 can determine the pulse amplitude Ap according to:

$$Ap = Sp - (Sa + Su)/2 \tag{1}$$

If the timing analysis component 414 determines that the amplitude obtained through the sampled values Sa, Sp, and Su and equation (1) is within a range corresponding to the expected amplitude of a pulse, the timing of the pulse is confirmed. Graph 704 plots the amplitude information (Ap) obtained from the sampled data, effectively removing a majority of the ambient light portion of the waveform. Timing analysis component 414 can compare this pulse sequence with the expected pulse sequence generated by the emitter 302 to determine whether the pulse-modulated beam has been received. It is to be appreciated that, although three digital samples were taken in this described example, some embodiments may obtain more than three samples per pulse period in order to determine presence and amplitude of a pulse.

In the case of pulse signals comprising pulses of fixed amplitude (with either fixed timing between consecutive pulses or timings between pulses that vary according to a defined pattern), it may only be necessary to confirm that the timings between the pulses identified in this manner conform to the expected timing. For pulse sequences having a fixed time between pulses, this may only require measuring the times between consecutive pulses identified using the sampling technique above, and confirming that these times are within a reasonable tolerance of the expected pulse period. For sequences in which timings between consecutive pulses vary according to a repeating pattern of N pulse periods, the timings between the identified pulses can likewise be verified against the expected series of time delays between pulses. In some embodiments, the signal sent by the emitter may also comprise pulses having amplitudes that vary between pulses according to a defined, repeating amplitude pattern. In such embodiments, the individual pulse amplitudes derived using the sampling techniques described above can also be analyzed across a range of pulse periods (e.g., N pulse periods in the case of a repeating N-pulse pattern) in order to determine whether the valid amplitude pattern is present in the received signal. This may involve, for example, determining the relative calculated amplitudes of the pulses within the range of N pulse periods, determining amplitude ratios between pairs of pulses across the N pulse periods, or determining an average calculated amplitude for the N pulses within the range of N pulse periods. This amplitude verification can be combined with the timing verification described previously to determine whether the valid emitted signal was received, and control the sensor's output accordingly.

While light pulses can be emitted continuously by the emitter 302 in some embodiments, in other embodiments the emitter can emit the light pulses in bursts. In such embodiments, when comparing the recovered pulse sequence with the expected pulse sequence, the timing analysis component 414 can consider the length of the bursts and the time between bursts.

Figure 8:
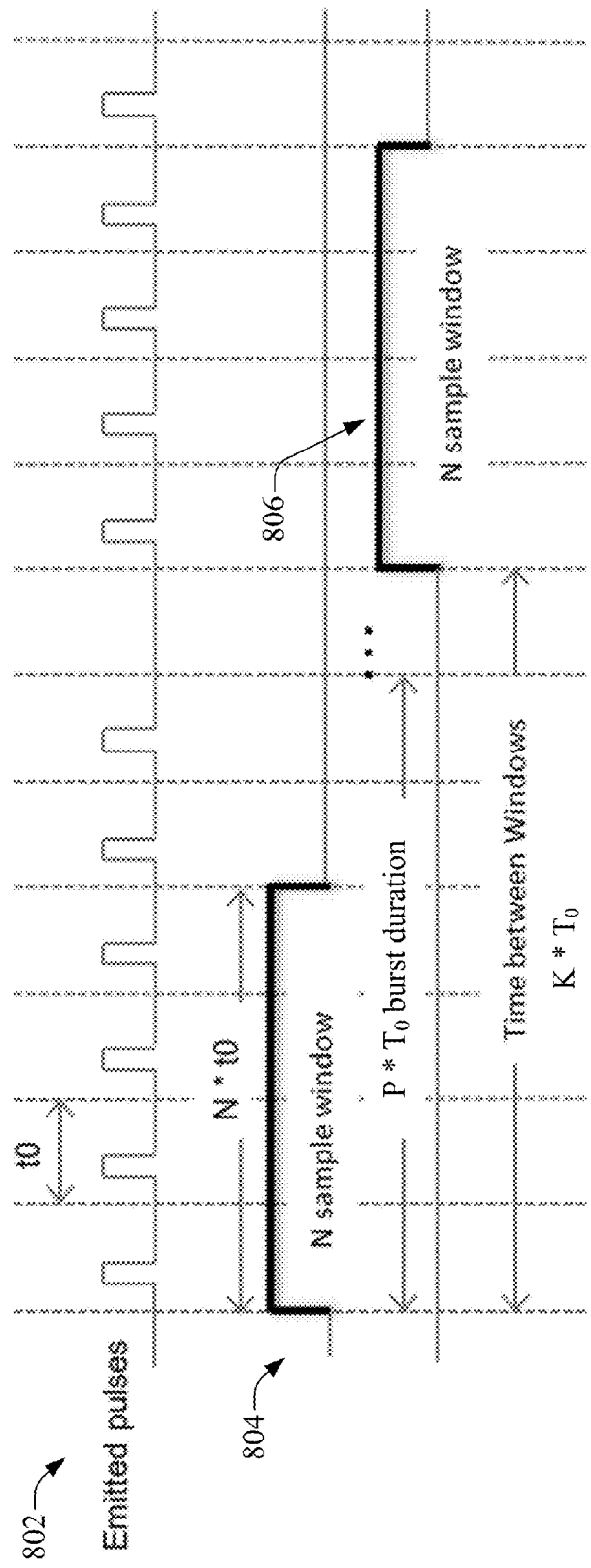
FIG. 8 is a timing diagram showing an example emitted pulse sequence received by a receiver and two consecutive sampling windows during which samples of the received pulse sequence are obtained.

In some embodiments, the receiver 402 can implement a recovery sequence in which sample measurements are obtained on a window of multiple pulses. FIG. 8 is a timing diagram showing an example emitted pulse sequence 802 received by the receiver 402 and two consecutive sampling windows 804 and 806 during which samples of the received pulse sequence are obtained. Although FIG. 8 depicts a pulse sequence comprising a fixed time between pulses, the described window-based sampling technique is also applicable in the case of pulses that have variable timings (that is, varying values of tx1) that accord to a predefined pattern.

Such patterns can be defined in terms of absolute time or relative time, allowing for reasonable tolerances. Also, although FIG. 8 depicts the pulses as having a constant amplitude, some embodiments may vary the amplitudes of the pulses in accordance with another predefined pattern, where such patterns may be defined in terms of relative variation between consecutive pulses.

A sampling window can be configured to encompass N pulse periods (where a pulse period has a duration of $T_0$), with a distance between the start of each sampling window set to K pulse periods, for a total time of $K*T_0$, as illustrated in FIG. 8. For photoelectric sensors that emit light pulses in bursts, a burst can be P samples long (for a total duration of $P*T_0$), where P is greater than N. although FIG. 8 depicts the sampling windows 804 and 806 as being non-contiguous, in some embodiments the sampling windows 804 and 806 can be contiguous or overlapping.

Figure 9:
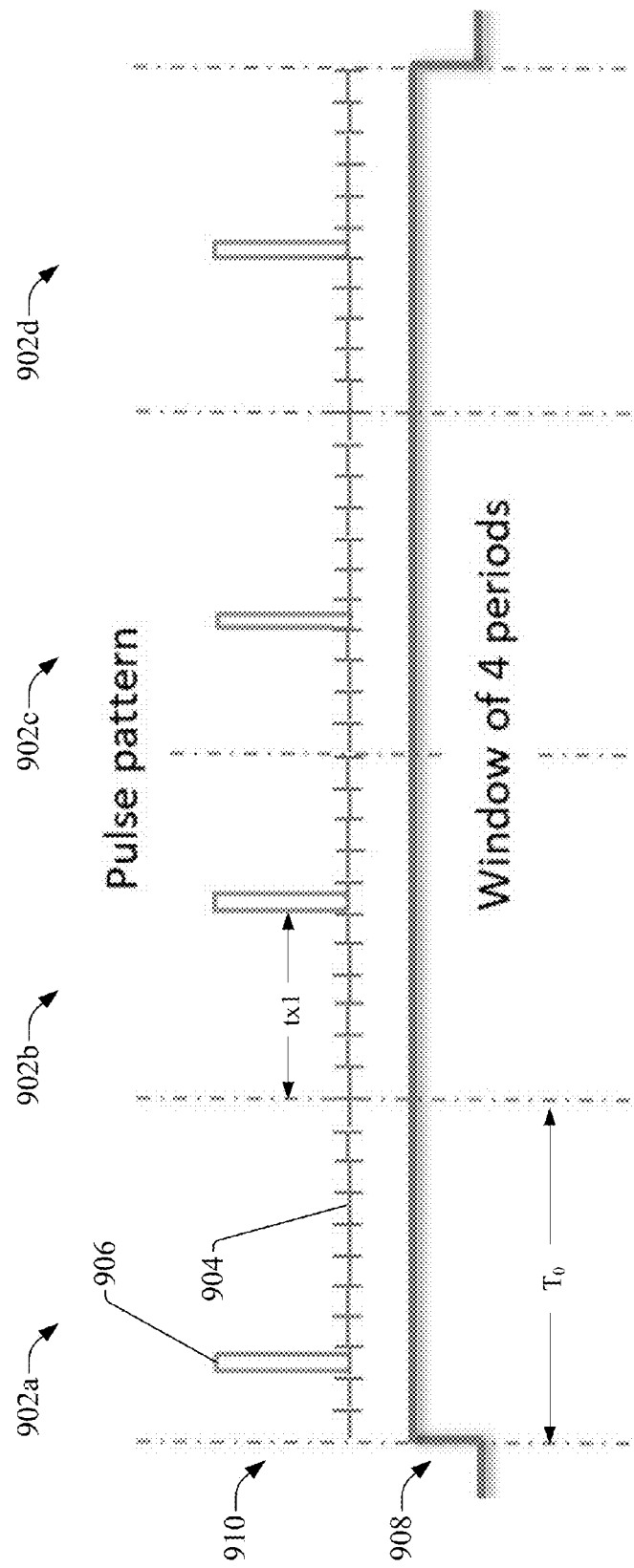
FIG. 9 is a graph of an example pulse pattern within a sampling window comprising four pulse periods.

In some embodiments (particularly in some diffuse or retro-reflective embodiments), the emitter's pulse generator 304 can generate a different pulse pattern within a sample window (that is, the value of tx1 may vary between pulse periods within a window), and/or from window to window. In general, the pulse pattern within a given window is defined by the position of the pulse within the period $T_0$ for each of the pulses within the window (e.g., the values of tx1 for the respective periods $T_0$ within the sampling window). FIG. 9 is a graph of an example pulse pattern 910 within a sampling window 908 comprising four pulse periods 902a-902d. In this example pattern, a period $T_0$ is divided into eleven segments 904, each segment 904 corresponding to a value of tx1. Within each period, the pulse 906 can be placed on one of eight possible positions within the period, the first two and last two segments of the period being reserved to allow sufficient separation between each pulse. The example illustrated in FIG. 9 assumes a pattern comprising values of tx1 that vary between pulse periods according to a defined or pseudorandom sequence. In such embodiments, the combination of pulse positions tx1 for the respective periods within the sampling window defines the pattern for that sampling window. It is to be appreciated, however, that similar window-based sampling techniques can be used in the case of patterns having fixed times between pulses.

The emitter 302 and receiver 402 will be synchronized, so that the timing analysis component 414 is aware of the pattern emitted by the emitter 302 and will only recognize receipt of the light beam if the timing analysis component 414 detects a minimum number of expected pulse locations (that is, the expected values of tx1) within a given sampling window. Differentiating the pulse patterns between different sensors can prevent cross-talk between sensors that are proximate to one another, since a given receiver 402 will be trained to recognize the pulse pattern emitted by its corresponding emitter 302 (e.g., via preset settings configured in the unit, or by teaching the receiver to recognize the pattern via IO-Link communication or hardware controls).

In an example scenario in which a sampling window corresponds to twelve pulses, pulses are one microsecond in duration with 80 microseconds between pulses, and assuming the timing analysis component 414 must recognize a minimum of eight valid pulses (that is, eight pulses within the sample window that are at their expected locations within their respective periods, as defined by the values of tx1 for the respective periods) in order to confirm receipt of the pulse modulated light beam, then pulses must be aligned eight times out of twelve.

As noted above, the receiver 402 must be synchronized with the emitter 302 so that the receiver will sample the analog signal generated by the TIA 506 at appropriate times to confirm receipt of the pattern generated by the emitter. In the case of diffuse photoelectric sensors, the emitter 302 and receiver 402 are located within the same sensor housing, and therefore can easily exchange synchronization information. As such, the emitter 302 and receiver 402 of a diffuse photoelectric sensor are readily synchronized. For example, the emitter can inform the receiver of the pattern emitted by the emitter 302, thereby training the receiver to confirm whether the correct pattern was received. That is, the receiver 402 has a priori knowledge of the pulse period $T_0$ (and the positions tx1 within the periods in the case of variable tx1 embodiments) at which the pulses are located, as transmitted by the emitter 302.

In the case of through-beam sensors, in which the receiver is housed in a separate unit relative to its corresponding emitter, the emitter 302 may not be able to directly convey synchronization data to the emitter to provide this information. Accordingly, other techniques can be carried out by the pulse identification component 410 and synchronization component 412 to facilitate synchronization between the emitter and receiver in the case of through-beam sensors. To this end, in order to provide the receiver 402 with a time reference based on the pattern emitted by the emitter 302, the pulse identification component 410 can be configured to learn from the pulse signal received from the emitter 302. In some embodiments, this synchronization process can execute on the receiver continuously, but its evaluation and tuning frequency can be adjusted based on a determined quality of the synchronization. Characteristics of the emitter 302 can be learned by the receiver 402 during an alignment process of the sensor, taught, or preset (depending on the information available and means of communicating with the receiver) and used as a baseline for initialization of the synchronization process.

Figure 10:
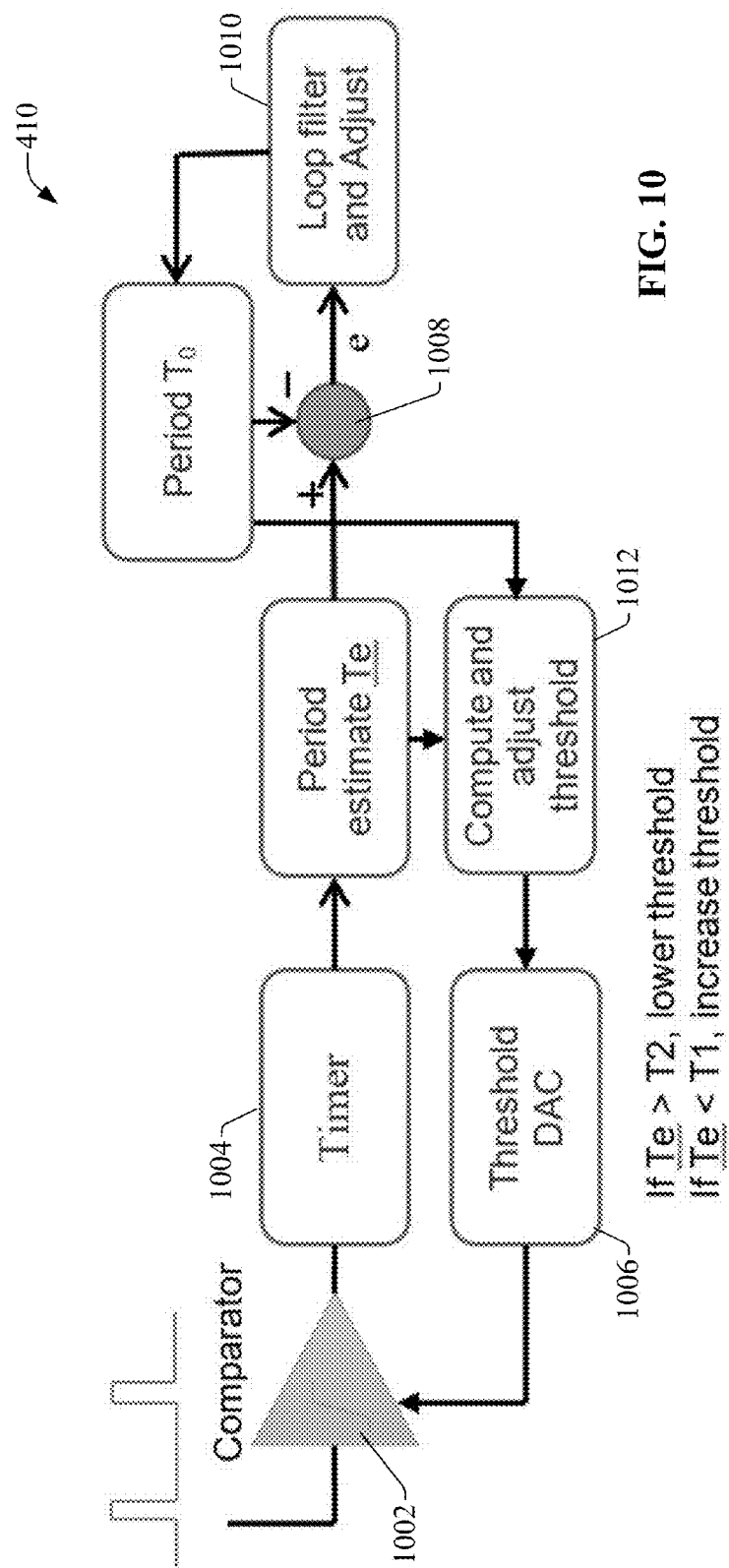
FIG. 10 is a block diagram illustrating a synchronization algorithm that can be carried out by a receiver to facilitate synchronization between the receiver and an emitter for a through-beam photoelectric sensor.

FIG. 10 is a block diagram illustrating a synchronization algorithm that can be carried out by the receiver's pulse identification component 410 to facilitate synchronization between the receiver 402 and emitter 302 for a through-beam photoelectric sensor. This general synchronization technique for through-beam sensors is applicable for emitted pulse patterns having a fixed time between consecutive pulses (that is, non-varying values of tx1), or, with appropriate modifications, for pulse patterns in which tx1 varies between pulse periods according to a defined pattern that repeats after a number of pulse periods. In an example scenario, the through-beam emitter 302 can be configured to emit pulses having a relatively large width (e.g., 2 to 2.5 microseconds). The emitter 302 sends pulses continuously with a fixed period and duty cycle, in accordance with the general pulse pattern generating technique described above in connection with FIGS. 6-9. Since the exact time between pulses and the positions of the pulses are initially unknown to the receiver, the timing analysis component 414 is configured to measure and learn pulse timings using a timer 1004 triggered by a pulse edge detector of a comparator 1002.

Synchronization in this case can be performed using a combination of fast sampling during a teaching phase and the use of comparator 1002 to detect rising pulse edges and measure times between the rising edges. Comparator 1002 receives the output of TIA 506 (see FIG. 5), and is configured to detect pulse leading edges based on a comparison of the magnitude of the signal received from the TIA 506 and a threshold value. In some embodiments, the threshold value can be converted to an analog reference signal by digital-to-analog converter (DAC) 1006 for reference by the comparator 1002. When the comparator 1002 determines that the received signal from the TIA 506 exceeds the threshold value (that is, crosses the threshold value in the increasing direction), the pulse identification component 410 assumes that an emitted pulse has been received. As will be described in more detail below, the threshold value can be adjusted automatically by the receiver 402 to improve accuracy of this pulse detection.

Timer 1004 is configured to run for a predefined period, either a default value (e.g., if the emitter has not previously been synchronized) or a previously calculated value. When comparator 1002 detects a leading edge of a received pulse (that is when a rising edge of the signal received from the TIA 506 crosses the threshold value output by threshold DAC 1006), timer 1004 activates and begins running. Comparator 1002 can include a filter function for removing high frequency noise, preventing the timer from activating in response to spurious spikes in the signal.

Figure 11:
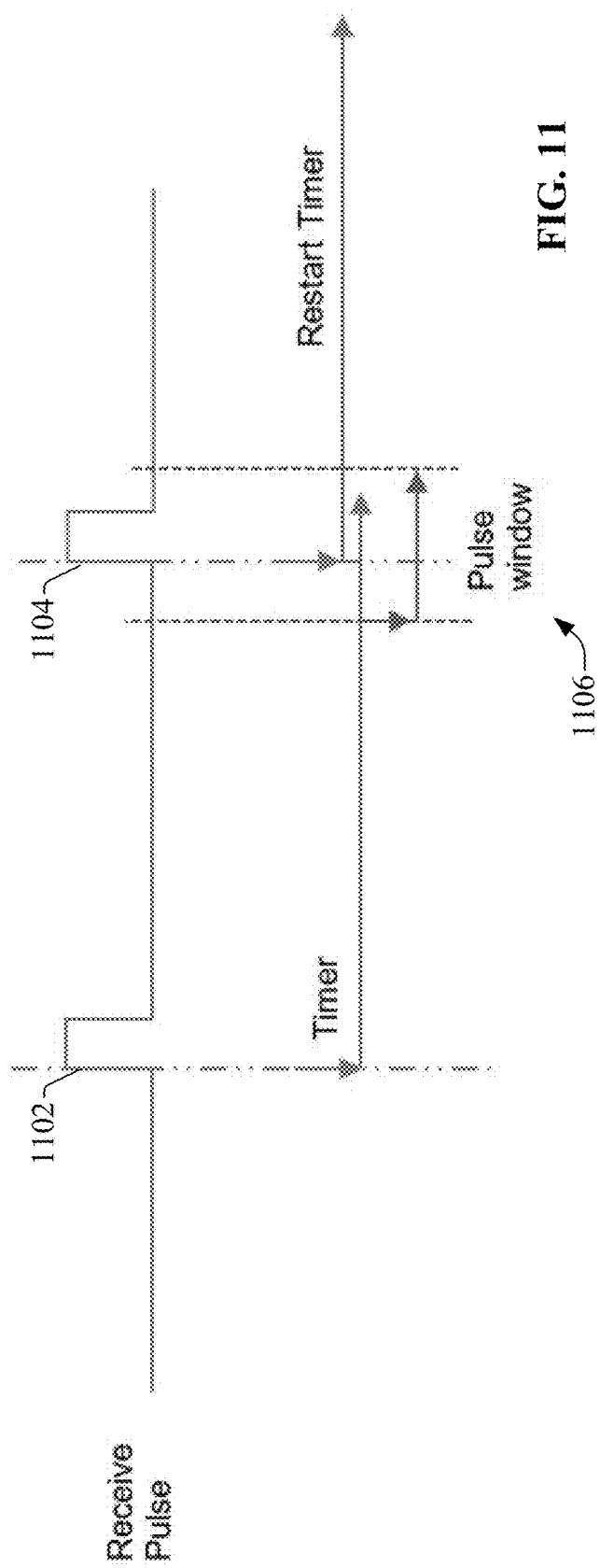
FIG. 11 is a timing diagram illustrating behavior of a timer maintained by a receiver in response to received pulses.

FIG. 11 is a timing diagram illustrating behavior of the timer 1004 in response to received pulses. Prior to receipt of the first pulse, the comparator 1002 and timer 1004 are fully enabled. When a leading edge of a pulse is detected at 1102, the timer initiates and begins running. If a second pulse is received within the expected window defined by the timer value (e.g., at 1104), the timer restarts and the process repeats. If no pulse is received before the timer reaches the predefined duration, the timer reloads automatically and the system waits for another pulse to be detected by comparator 1002. In some embodiments, the emitter may only enable the timer and/or the comparator during defined pulse windows 1106. A pulse window 1106 represents a window of time during which the next incoming pulse is expected, and may be set by the emitter based on current estimates of the pulse pattern. In some embodiments, one or both of the timer 1104 or the comparator 1102 can be selectively enabled only during these defined pulse windows 1106, and disabled at other times. That is, after the first pulse is received and the timer begins running the first time, one or both of the comparator 1002 or the restart capability of the timer 1004 will be disabled until the next pulse window 1106 begins. In the case of disabling the timer 1004, only the reset/restart capability of the timer is disabled outside the pulse windows 1106; the timer value will continue to increment after a pulse is received and prior to receipt of the subsequent pulse, even after the pulse window 1106 for a given pulse has expired. That is, the timer will continue to increment, but will only be reset and restarted if a pulse is received during a defined pulse window 1106.

In general, the pulse window 1106 is defined as a narrow time range within which the next pulse is expected to be received, based on the current estimated value of $T_0$. For example, the pulse window may be defined to begin at a time $(T_0-x)$ relative to the time at which the previous pulse was received, and to end at time $(T_0+x)$ relative to the time at which the previous pulse was received, where x is a tolerance value. However, other techniques for defining the pulse window are also within the scope of this disclosure.

When the second pulse is received within the expected pulse window 1106 (where the start and end times for the pulse window 1106 may be defined relative to the start of the first pulse), the timer value Te at the time that the second pulse is received represents the time between the pulses, or an estimate of the pulse period. This pulse period estimate Te can be used to determine the difference between the timer period $T_0$ and the actual time between pulses Te (difference function 1008). Based on this difference, a loop filter and adjust block 1010 can adjust the learned pulse period $T_0$. In some embodiments, the pulse identification component 410 can be configured to continuously update the learned pulse period $T_0$ in response to receipt of a new pulse. In other embodiments, pulse identification component 410 can be configured to update $T_0$ based on averages of multiple consecutive received pulses.

In the case of through-beam sensors that use a signal comprising fixed times between pulses, this learned pulse period $T_0$ can be sufficient to synchronize the emitter and receiver, since this pulse period $T_0$ is the primary factor required by the emitter in order to anticipate when a pulse will arrive. Accordingly, synchronization function block 518 can provide this synchronization information (the learned pulse period $T_0$) to the ADC 512 (e.g., via firmware 520 of the sensor), and the signal detection technique described above in connection with FIGS. 6-9 can be performed based on this synchronization data. That is, the ADC 512 will determine appropriate sample points Sa, Sp, and Su corresponding to a location at which a pulse is expected based on the learned time between pulses $T_0$ obtained by the pulse identification component's algorithm.

For through-beam sensors that employ a repeating pattern of pulses having variable times between pulses within the pattern period, synchronization of the receiver will require both the average pulse period $T_0$ as well as the positions of the individual pulses within a pattern cycle (e.g., the values of tr1 for each pulse within the repeating pattern). Accordingly, in such embodiments, the pulse identification component 410 can use timer 1004 to measure the times between the pulses within the pattern period and generate synchronization information based on the average time between the pulses (the average pulse period $T_0$), as well as the individual time delays between consecutive pulses. For example, for a pattern comprising four pulses having times that vary between pulses within a given pattern cycle (e.g., similar to the example signal depicted in FIG. 9), and where pattern repeats using the same time delays between pulses for every four-pulse pattern cycle, timer 1004 can measure and record the times between each of the four consecutive pulses as well as the time between the last pulse and the start of the first pulse of the next pattern cycle, yielding timer values T1, T2, T3, and T4 (some patterns may comprise more or fewer pulses per pattern cycle). The pulse identification component 410 then calculates the average pulse period $T_0$ as the average of the four measured times, and adjusts the learned value of $T_0$ accordingly.

The individual times between pulses T1-T4 are indicative of the locations of each of the pulses within a given pulse period $T_0$ and are a function of the values of tx1 used by the emitter to offset each pulse of the pattern relative to the start of the pulse's period. With the average period between pulses $T_0$ and the position of the pulse edges T1-T4 within the pattern cycle known, synchronization component 412 can provide this synchronization information to the ADC 512 (e.g., via firmware 520 of the sensor), and the signal detection technique described above in connection with FIGS. 6-9 can be performed, whereby timing of sample points Sa, Sp, and Su can be selected based on the synchronization information. The timing analysis component 414 can verify that the locations of the pulses indicated by the digital samples matches a predefined expected pattern (as determined by the synchronization information generated by pulse identification component 410) to determine whether the pulse-modulated signal is valid, where synchronization of the timer, comparator, and ADC is based on the timing and position of the pattern. The output control component 416 can then control the sensor's output based on whether the valid signal is detected by the timing analysis component 414).

One or both of the measured value Te or the learned pulse period $T_0$ can also be used by a compute and adjust threshold block 1012 to adjust the threshold value used by the comparator 1002 to identify incoming pulses. For example, lower and upper limits (T1 and T2, respectively) can be configured for the value of period estimate Te. If Te (or the average time between multiple pulses if an averaging window is used) is higher than the upper limit T2, it is assumed that not enough valid pulses are being detected due to the threshold value of the DAC being set too high. Accordingly, if the period estimate Te is found to exceed T2, the DAC 1006 will adjust the threshold downward until the value of Te falls within the range between T1 and T2. Alternatively, if Te is lower than the lower limit T1, it is assumed that the comparator and timer are being triggered too frequently by noise due to the threshold being too low. Accordingly, if the period estimate Te is found to be lower than T1, the DAC will adjust the threshold upward until the value of Te falls within the range between T1 and T2. After synchronization is achieved, the pulse amplitude measured by the ADC 512 can also be used to adjust the comparator threshold.

Figure 12:
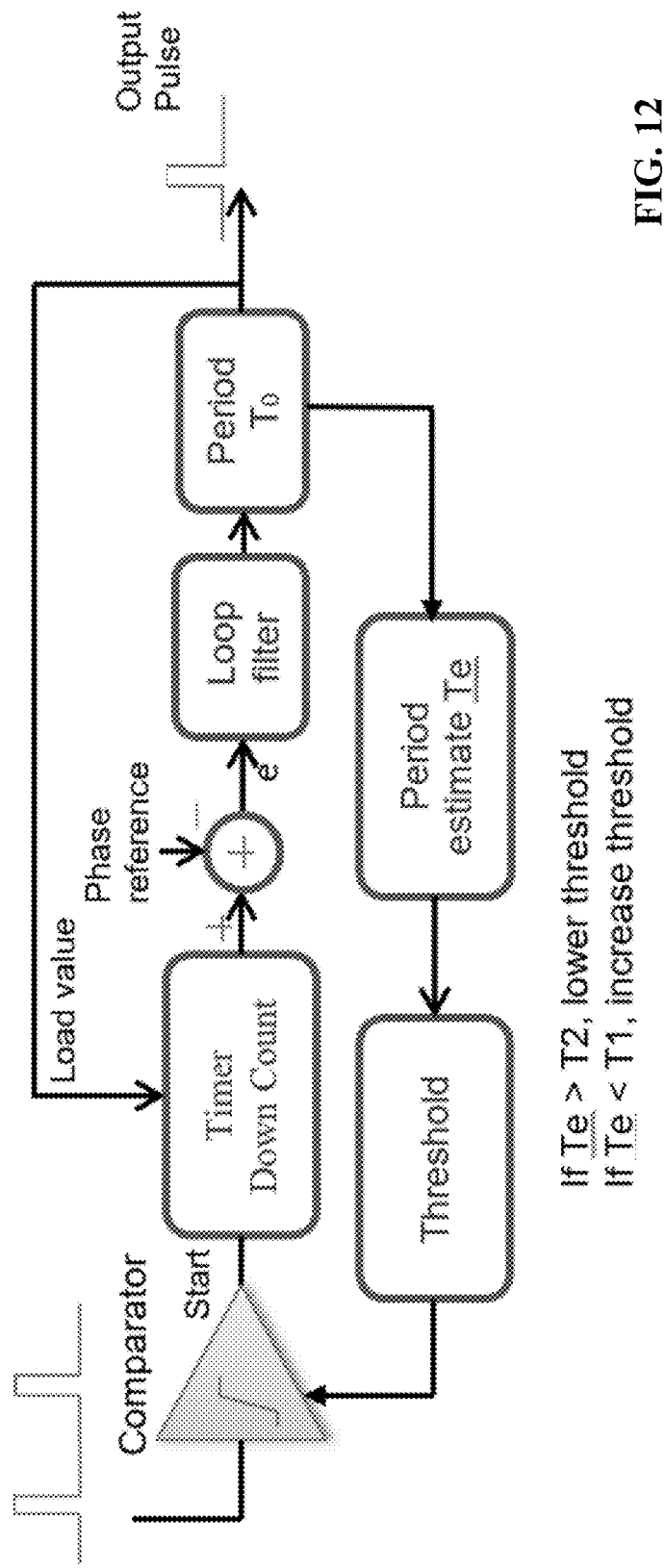
FIG. 12 is a block diagram illustrating a synchronization algorithm that can be carried out by a receiver to estimate the phase of a received signal.

Some embodiments can use other techniques for measuring and locking onto an incoming pulsed signal. For example, in some embodiments the comparator output can also be used to estimate the phase as well as the period, and generate directly a synchronized signal used to trigger incoming pulse sampling (ADC conversion). FIG. 12 is a block diagram illustrating a synchronization algorithm that can be carried out by the receiver's pulse identification component 410 to estimate the phase. The overall synchronization algorithm carried out by the pulse identification component 410 of the receiver's MCU 510 can be equivalent to a phase locked loop (PLL) implementation including a mix of hardware blocks (e.g., timer 1004, comparator 1002, etc.) and firmware 520 (see FIG. 5).

Figure 13:
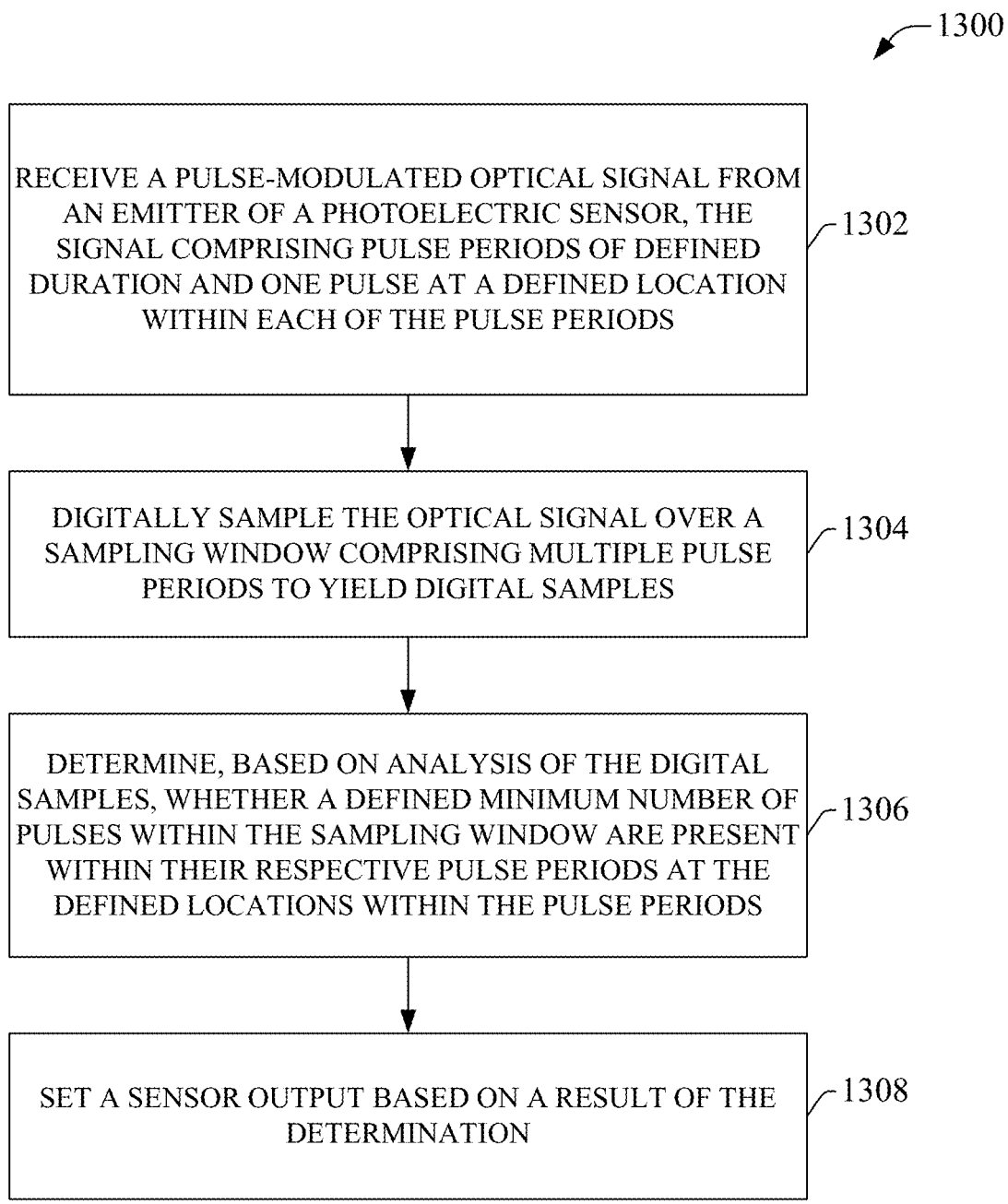
FIG. 13 is a flowchart of an example methodology for processing light received by a receiver of a photoelectric sensor and controlling an output of the sensor based on detection of a pulse-modulated light beam transmitted by the sensor's emitter.
Figure 14:
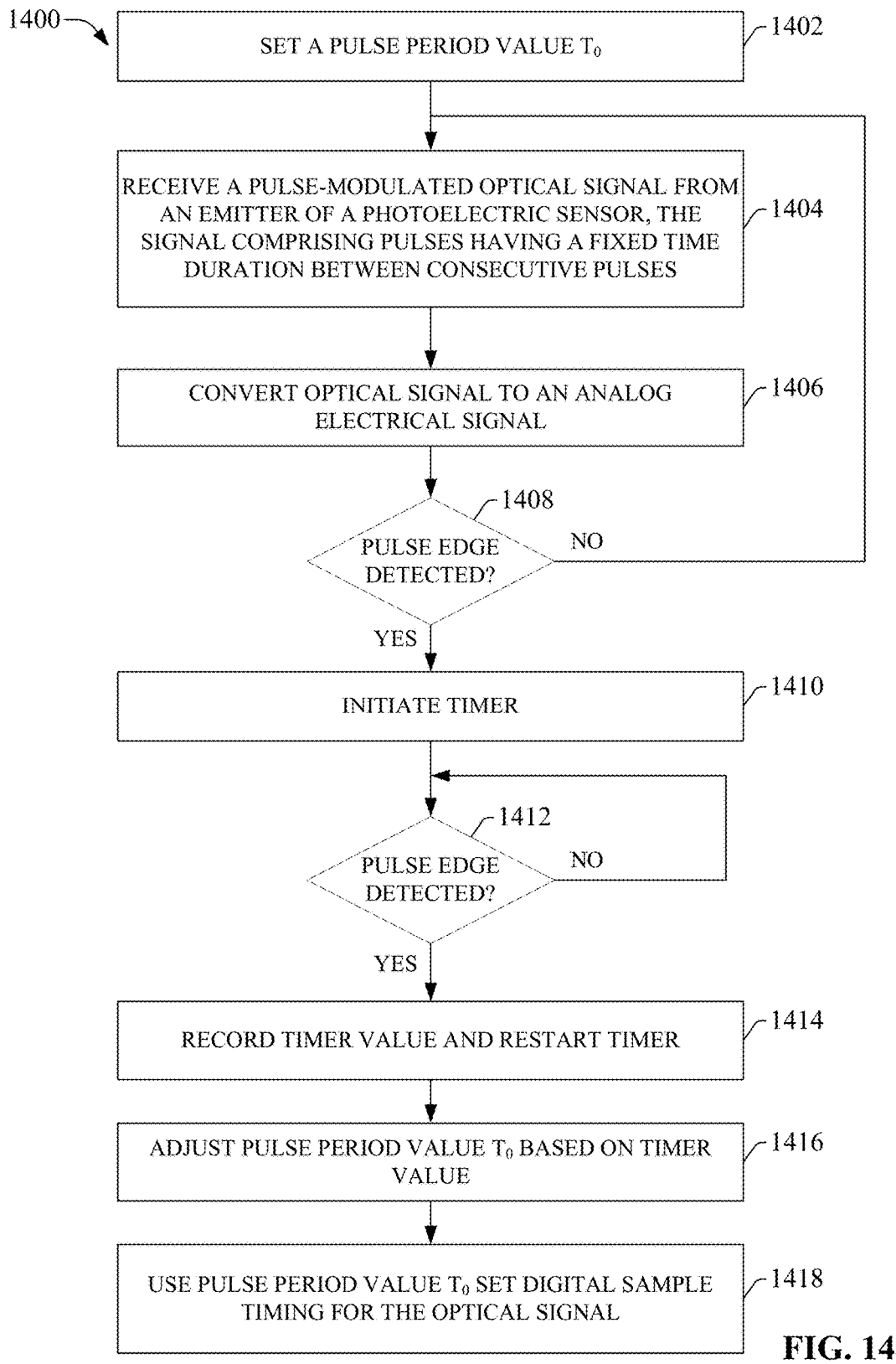
FIG. 14 is a flowchart of an example methodology for learning synchronization information that can be used to synchronize digital sampling of a pulse-modulated light beam by a through-beam photoelectric receiver in accordance with a pulse pattern emitted by a corresponding photoelectric emitter.
Figure 15:
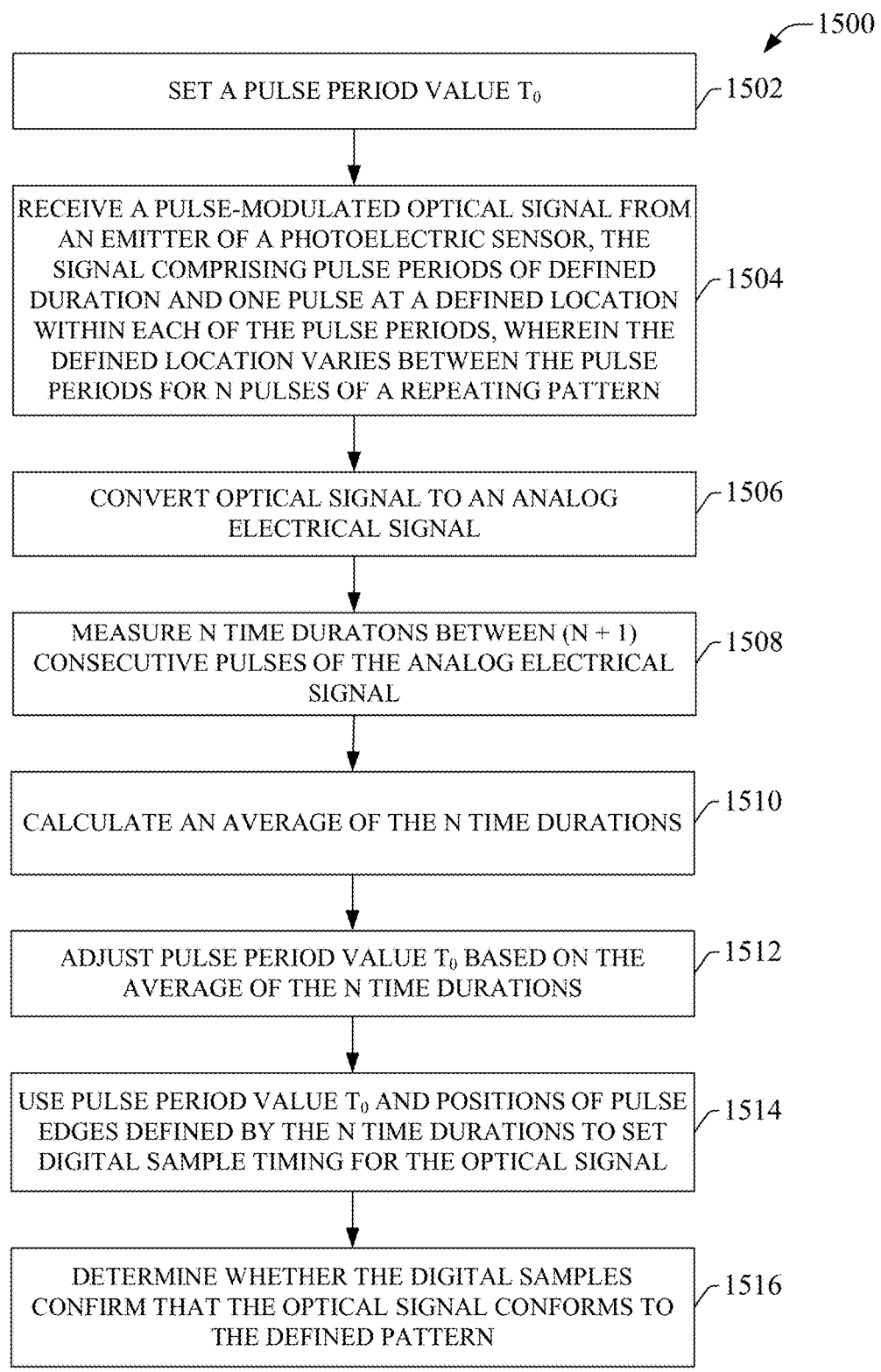
FIG. 15 is a flowchart of an example methodology for learning synchronization information that can be used to synchronize digital sampling of a pulse-modulated light beam by a through-beam photoelectric receiver, in a scenario in which the light beam is modulated with a pulse pattern having variable timing between the pulses.

FIGS. 13-15 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for processing light received by a receiver of a photoelectric sensor and controlling an output of the sensor based on detection of a pulse-modulated light beam transmitted by the sensor's emitter. Initially, at 1302, a pulse modulated optical signal is received from an emitter of a photoelectric sensor. The signal can comprise a number of pulse periods of defined duration, with one pulse placed at a defined location within each pulse period. In some embodiments, the time between consecutive pulses can be fixed across all pulse periods. Alternatively, in other embodiments, the locations of the pulses within the respective pulse periods can vary between the periods according to a defined, recognizable pattern (e.g., a pattern comprising N pulse periods that repeats every N periods.

At 1304 the optical signal can be digitally sampled over a sampling window comprising multiple pulse periods to yield digital samples. The sampling times can be based on synchronization information obtained by the receiver during a synchronization operation between the emitter and the receiver. For example, for each pulse period, three digital samples can be obtained corresponding to a time prior to the expected pulse, a time during the expected pulse, and a time after the expected pulse.

At 1306, a determination is made, based on analysis of the digital samples obtained at 1304, as to whether a defined minimum number of pulses within the sampling window are present within their respective pulse periods at the defined locations within the pulse periods. Presence of the pulses within each period can be determined, for example by calculating an amplitude value based on the three digital samples collected for each period, and determining whether the calculated amplitude is within a range indicative of the presence of a pulse. Once the pulses have been identified, a further determination can be made to ascertain whether each pulse is within its expected location within its pulse period. In the case of signals comprising a fixed timing between pulses, this can comprise confirming that the time between the detected pulses corresponds to the fixed timing. For embodiments in which the time between pulses in consecutive periods varies according to a defined pattern, the analysis can confirm that the pulses conform to the defined pattern in amplitude and in timing between pulses. At 1308, a sensor output is set based on the determination at 1306 that the defined minimum number of pulses have been identified at the expected locations within their respective pulse periods. For normally-on sensors, the output may be set as long as the minimum number of pulses are detected for each sampling window, and will be turned off when less than the defined minimum number of pulses are detected. For normally-off sensors, the output may remain off while the minimum number of pulses are detected, and will be turned on when the minimum number of pulses are not detected.

FIG. 14 illustrates an example methodology 1400 for learning synchronization information that can be used to synchronize digital sampling of a pulse-modulated light beam by a through-beam photoelectric receiver. Initially, at 1402 a value of a pulse period $T_0$ is set, representing an estimated average period between pulses. At 1404, a pulse-modulated optical signal is received from the emitter, where the signal comprises pulses having a fixed time duration (within a tolerance) between consecutive pulses. At 1406, the optical signal is converted to an analog electrical signal.

At 1408 a determination is made as to whether a pulse edge is detected within the analog electrical signal. If no pulse edge is detected (NO at step 1408), the methodology returns to step 1404 and the optical signal continues to be received. Alternatively, if a pulse edge is detected (YES at step 1408), the methodology proceeds to step 1410, where a timer is initiated. In some embodiments, the timer will be initiated at 1410 only if the pulse is detected during a pulse window, which is defined as a window that begins a brief time prior to an expected time of the pulse's leading edge and ends a brief time after this expected time. That is, the pulse window is defined as a narrow time range within which the next pulse is expected to be received, based on the value of $T_0$. For example, the pulse window may be defined to begin at a time ($T_0$−x) after a previous pulse was detected and to end at time ($T_0$+x) after the previous pulse was detected, where x is a tolerance value. If the pulse is not detected within this pulse window, the timer will not initiate at step 1410.

At 1412, a determination is made as to whether another pulse edge is detected within a subsequent pulse window. If no subsequent pulse edge is detected (NO at step 1412), the methodology continues to wait until a pulse is detected. If a subsequent pulse is detected (YES at step 1412), the methodology proceeds to step 1414, where the value of the timer at the time the subsequent pulse was received is recorded and the timer is restarted (in order to record the relative time at which the next pulse is received). At 1416, the pulse period value $T_0$ is adjusted based on the timer value recorded at step 1414. At 1418, the adjusted pulse period value is used to set digital sample timing for the optical signal; e.g., the digital sampling performed at 1304 of methodology 1300). This synchronization information can also be used to confirm the presence of a valid pulse signal at step 1306 of methodology 1300 in the case of fixed-time pulse durations.

FIG. 15 illustrates an example methodology 1500 for learning synchronization information that can be used to synchronize digital sampling of a pulse-modulated light beam by a through-beam photoelectric receiver, in a scenario in which the light beam is modulated with a pulse pattern having variable timing between the pulses. Initially, at 1502, a value of an average pulse period $T_0$ is set, representing an estimated average period between pulses. At 1504, a pulse-modulated optical signal is received from the emitter, where the signal comprises pulses having variable times between consecutive pulses, where the variable times conform to a predefined, repeating pattern comprising a finite number of pulses. For example, the pattern cycle may comprise N pulses (where N is a finite integer), where the timings between consecutive pulses within the pattern cycle vary within the cycle, and the same timings are repeated for consecutive cycles. At 1406, the optical signal is converted to an analog electrical signal.

At 1508, N time durations between (N+1) consecutive pulses of the analog electrical signal are measured (e.g., using the timer-based method described in methodology 1400). At 1510, an average of the N time durations is calculated. At 1512, the estimated average pulse period value $T_0$ is adjusted based on the average calculated at step 1510. At 1514, the pulse period value $T_0$ and the positions of the pulse edges as determined based on the N time durations measured at step 1508 are used as synchronization information to set digital sampling timing for the optical signal. This synchronization information can also be used by the receiver to recognize the pattern emitted by the emitter and thus confirm whether the emitter's pulse-modulated light beam has been received. At 1516, a determination is made as to whether the digital samples collected according to the timings at step 1514 match the defined pattern, as determined based on the estimated pulse period T0 and the N time durations.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
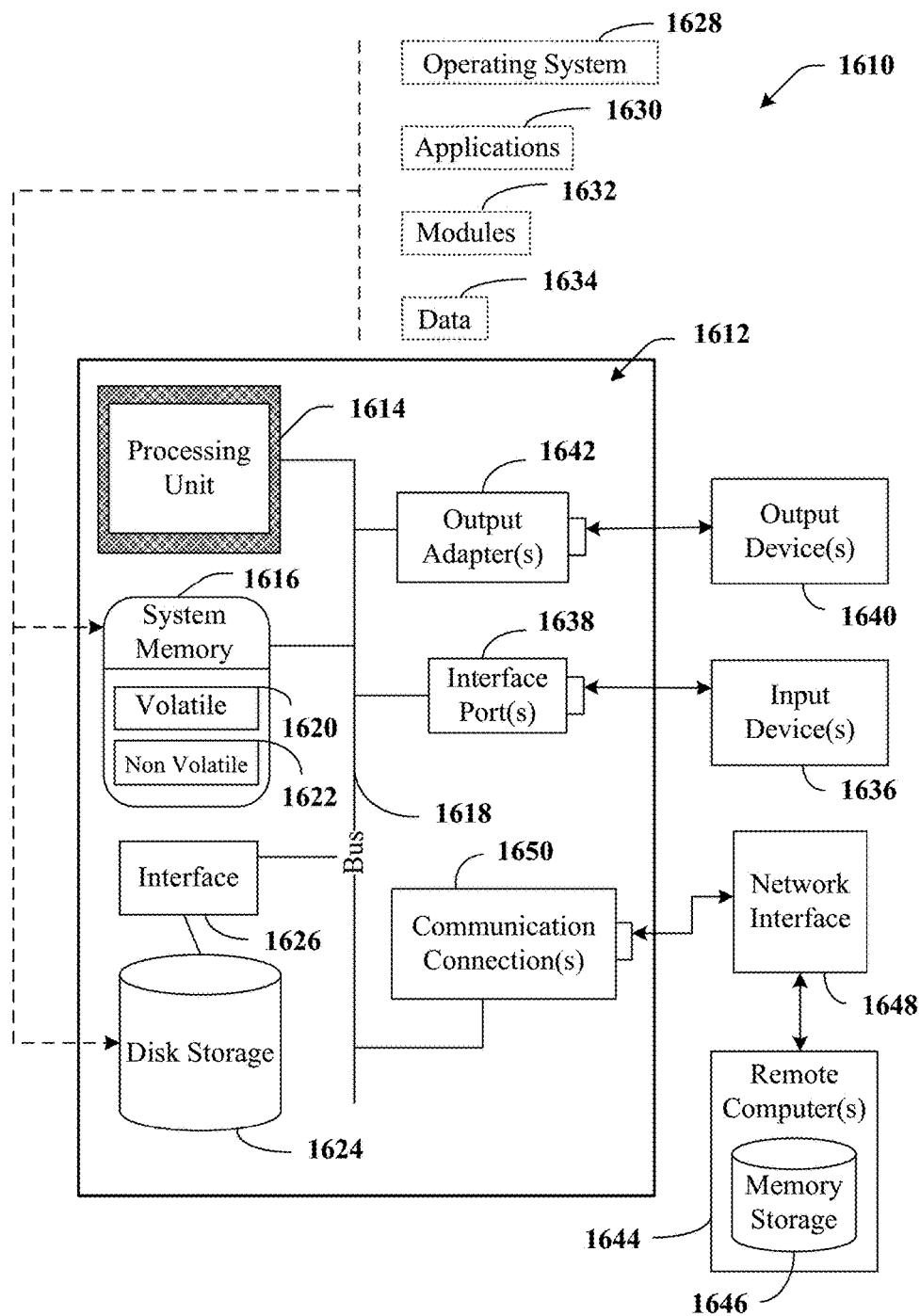
FIG. 16 is an example computing environment.
Figure 17:
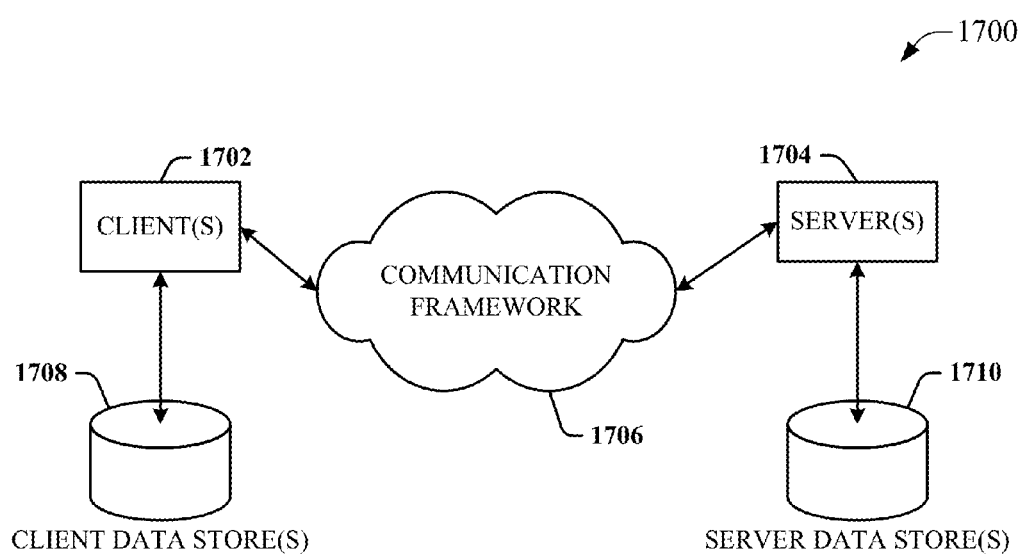
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multicore microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A photoelectric sensor, comprising:
   a photo-detector component configured to receive optical information and convert the optical information to an analog signal, the optical information including a light beam having a modulated signal comprising a series of pulses emitted at a rate of one pulse per pulse period;
   a synchronization component configured to
     identify presence of pulses within the analog signal,
     determine respective durations between consecutive pulses of the series of pulses within the analog signal,
     calculate an estimated average pulse period based in part on an average of the respective durations, and
     generate synchronization information for a receiver of the photoelectric sensor, the synchronization information specifying the respective durations and the estimated average pulse period.

2. The photoelectric sensor of claim 1, wherein the series of pulses have a fixed timing between the pulses.

3. The photoelectric sensor of claim 1, wherein a time between consecutive pulses of the series of pulses varies across N pulse periods in accordance with a defined pattern, and wherein the defined pattern repeats every N pulse periods, where N is an integer.

4. The photoelectric sensor of claim 1, further comprising:
   a digital sampling component configured to digitally sample the analog signal at a sample timing defined by the synchronization information to yield digital sample information; and
   a pulse identification component configured to identify the presence and timings of the pulses in the analog signal based on the digital sample information.

5. The photoelectric sensor of claim 3, wherein the synchronization component is configured to:
   determine, as at least a first portion of the synchronization information, the respective durations between (N+1) consecutive pulses of the series of pulses within the analog signal, and
   calculate, as at least a second portion of the synchronization information, the estimated average pulse period based on an average of the respective durations.

6. The photoelectric sensor of claim 4, further comprising:
   a timing analysis component configured to determine whether the timings of the pulses correspond to an expected timing defined by the synchronization information; and
   an output control component configured to control an output based on a result generated by the timing analysis component.

7. The photoelectric sensor of claim 4, wherein
   the digital sampling component is configured to collect, as the digital sample information for a pulse period, a first sample at a first time prior to an expected location of a pulse within the pulse period, a second sample at a second time corresponding to the expected location of the pulse within the pulse period, and a third sample at a third time after the expected location of the pulse within the pulse period, and
   wherein the digital sampling component determines the expected location based on the synchronization information.

8. The photoelectric sensor of claim 7, wherein the pulse identification component is configured to determine an amplitude value based at least on values of the first sample, the second sample, and the third sample, and to identify presence of the pulse within the pulse period in response to determining that the amplitude value satisfies a criterion indicative of a presence of a pulse.

9. The photoelectric sensor of claim 8, wherein
   the pulse identification component is further configured to determine relative magnitudes of the amplitude value and at least one other amplitude value calculated for at least one other pulse period, and
   the output control component is further configured to control the output further based a determination of whether the relative magnitude corresponds to an expected relative magnitude indicative of a defined amplitude pattern.

10. The photoelectric sensor of claim 6, wherein the timing analysis component is configured to, for a sample window comprising multiple pulse periods, determine whether a defined minimum number of pulses within the sample window are identified at respective locations indicated by the synchronization information.

11. The photoelectric sensor of claim 6, wherein the timing analysis component is configured to perform timing analysis on multiple sample windows including the sample window, and wherein the multiple sample windows comprise at least one of non-contiguous sample windows or sample windows that overlap in time.

12. A method of operating a photoelectric sensor, comprising:
receiving, by a photoelectric sensor comprising at least one processor, optical information including a light beam modulated with a signal comprising pulses, the pulses received at a rate of one pulse per pulse period, wherein a timing between consecutive pulses of the pulses is one of fixed or varies in accordance with a defined pattern;
converting, by the photoelectric sensor, the optical information to an analog signal;
identifying, by the photoelectric sensor, presence of the pulses within the analog signal;
measuring, by the photoelectric sensor, respective durations between consecutive pulses of the pulses within the analog signal;
calculating, by the photoelectric sensor, an average pulse period based on an average of the respective durations; and
generating, by the photoelectric sensor, synchronization information identifying at least one of the respective durations or the average pulse period.

13. The method of claim 12, wherein
the identifying the presence of the pulses comprises identifying that an amplitude of the analog signal has crossed a defined threshold value in an increasing direction,
the measuring comprises recording a value of the timer in response to determining that the amplitude crosses the defined threshold in the increasing direction a subsequent time, and
the method further comprises:
increasing the defined threshold value in response to determining that the average pulse period is less than a defined minimum duration; and
decreasing the defined threshold value in response to determining that the average pulse period is greater than a defined maximum duration.

14. The method of claim 12, further comprising:
digitally sampling, by the photoelectric sensor, the analog signal according to a sample timing determined based on the synchronization information to yield digital sample information; and
determining, by the photoelectric sensor, pulse amplitude and timing information based on the digital sample information.

15. The method of claim 14, further comprising:
determining, by the photoelectric sensor, whether the pulse amplitude and timing information corresponds to an expected amplitude and timing specified by the synchronization information; and
controlling, by the photoelectric sensor, an output signal based on a result of the determining.

16. The method of claim 14, wherein the digitally sampling comprises:
collecting at least a first sample at a first time prior to an expected location of a pulse within a pulse period, wherein the expected location is determined based on the synchronization information;
collecting at least a second sample at a second time corresponding to the expected location of the pulse within the pulse period; and
collecting at least a third sample at a third time after the expected location.

17. The method of claim 14, wherein the determining the pulse amplitude and timing information comprises:
determining an amplitude value based on values of the first sample, the second sample, and the third sample,
confirming that the amplitude value satisfies a criterion indicative of a presence of a pulse, and
measuring durations between consecutive pulses confirmed to be present in consecutive pulse periods.

18. A non-transitory computer-readable medium having stored thereon executable components that, in response to execution, cause a processor to perform operations, the operations comprising:
receiving optical information including a light beam modulated with a signal comprising pulses, the pulses received at a rate of one pulse per pulse period, wherein a timing between consecutive pulses of the pulses is one of fixed or varies in accordance with a defined pattern;
converting the optical information to an analog signal;
identifying presence of the pulses within the analog signal;
measuring respective durations between consecutive pulses of the pulses within the analog signal;
calculating an average pulse period based on an average of the respective duration; and
generating synchronization information for a receiver of a photoelectric sensor, the synchronization information specifying at least one of the respective durations or the average pulse period.

19. The non-transitory computer-readable medium of claim 18, the operations further comprising
outputting the synchronization information to the receiver of the photoelectric sensor.

20. The non-transitory computer-readable medium of claim 18, wherein
the identifying the presence of the pulses comprises identifying that an amplitude of the analog signal has crossed a defined threshold value in an increasing direction,
the measuring comprises recording a value of the timer in response to determining that the amplitude crosses the defined threshold in the increasing direction a subsequent time, and
the operations further comprise:
increasing the defined threshold value in response to determining that the average pulse period is less than a defined minimum duration; and
decreasing the defined threshold value in response to determining that the average pulse period is greater than a defined maximum duration.

* * * * *